United States Patent
Levy

(10) Patent No.: US 11,120,494 B2
(45) Date of Patent: Sep. 14, 2021

(54) METHOD FOR DYNAMIC IDENTIFICATION OF GOODS AND SERVICES

(71) Applicant: Dror Levy, Medley, FL (US)

(72) Inventor: Dror Levy, Medley, FL (US)

(*) Notice: Subject to any disclaimer, the term of this patent is extended or adjusted under 35 U.S.C. 154(b) by 73 days.

(21) Appl. No.: 16/287,430

(22) Filed: Feb. 27, 2019

(65) Prior Publication Data

US 2019/0272582 A1 Sep. 5, 2019

Related U.S. Application Data

(60) Provisional application No. 62/637,613, filed on Mar. 2, 2018.

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0631* (2013.01)

(58) Field of Classification Search
CPC . G06Q 30/0639; G06Q 30/0631; G06Q 30/06
USPC .................................................. 705/26, 27
See application file for complete search history.

(56) References Cited

U.S. PATENT DOCUMENTS

| | | | | |
|---|---|---|---|---|
| 2005/0216551 | A1* | 9/2005 | Sirstins | H04M 3/5183 709/202 |
| 2006/0277108 | A1* | 12/2006 | Altberg | G06Q 30/0257 705/14.69 |
| 2012/0054028 | A1* | 3/2012 | Tengler | G06Q 30/02 705/14.49 |
| 2014/0087760 | A1* | 3/2014 | Bennett | H04W 4/40 455/456.3 |
| 2014/0164934 | A1* | 6/2014 | Yang | G06Q 10/101 715/738 |
| 2014/0279200 | A1* | 9/2014 | Hosein | G06Q 30/0601 705/26.7 |
| 2017/0140262 | A1* | 5/2017 | Wilson | G06N 3/02 |

OTHER PUBLICATIONS

"A new way to look at questions and engagement: emotionally," Daily Herald [Arlington Heights, Ill] Apr. 1, 2013: 48; Dialog #1322030702, 2pgs. (Year: 2013).*

* cited by examiner

*Primary Examiner* — Robert M Pond
(74) *Attorney, Agent, or Firm* — McHale & Slavin, P.A.

(57) ABSTRACT

A method of dynamically promoting goods and services by providing a display device having an embedded algorithm to make queries to a customer that would commence upon entering a contained environment that would narrowly and effectively communicate promotions of goods and services that are personal and individualized to the consumer is disclosed.

10 Claims, 2 Drawing Sheets

METHOD FOR DYNAMIC IDENTIFICATION OF GOODS AND SERVICES

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/637,613, entitled "METHOD FOR DYNAMIC IDENTIFICATION OF GOODS AND SERVICES", filed Mar. 2, 2018. The contents of which the above-referenced application is incorporated herein by reference in its entirety.

FIELD OF THE INVENTION

The present invention relates to a method for dynamically identifying goods and services employing an embedded algorithm to make selective queries to a consumer in a selected environment for the promotion of goods and services individualized to that consumer.

BACKGROUND OF THE INVENTION

Promotion covers the methods of communication that a marketer uses to provide information about its product. The information can be either or both verbal and visual to the potential consumer. Promotions can be held in specific locations or venues such as concerts, festivals, grocery stores, or the like, and usually allows for immediate purchase thereof. The promotion and eventual purchase of a product or service can be incentivized with discounted rates, free gifts, or the like. Promotions held in specific locations and venues usually involve the interaction between a customer and a brand or product representative. However, modern times have lead to less personal interactions between people, and more interaction between people and digital media. People now spend most of their time communicating using digital means rather than face to face communication. This form of communication via digital means has lead to the promotion of goods and services using digital media. Digital media, which includes internet, social networking and like media, is the modern and likely the most effective way for brands to interact with consumers.

One venue that is absent in the promotion of goods and service is a vehicle destination service such as Uber®. Consumers in a vehicle destination service are readily available and are devoid of distractions, thereby making a vehicle destination service consumer a captive audience for the promotion of goods and services. However, being able to effectively promote a good or service is tricky. The promotion must not seem too intrusive, annoying, forced, irrelevant, or coerced. The consumer is more likely to be attentive to the promotion if it seems like the decision-making process occurs on their own accord.

SUMMARY OF THE INVENTION

A method for dynamically promoting goods and services by providing a display device having an embedded algorithm to make queries to a customer that would commence upon entering a contained environment that would narrowly and effectively communicate promotion of goods and services that are individualized to the consumer is disclosed. More particularly, the display device includes at least an RF transmitter onboard a vehicle destination service vehicle, such as Uber®. The customer enters the vehicle, establishes a connection between the display device and the customer's mobile device, and gives permission to the display device to access personal data, such as cookies. Therein, the display device will make queries to the customer to establish a level of comfort with the customer. The algorithm then uses the queries and data obtained from the mobile device to narrowly and effectively communicate promotion of goods and services to the customer that are personalized and individualized.

Accordingly, it is an objective of the instant invention to provide a method of dynamically identifying goods and services employing an embedded algorithm to make selective queries to a consumer in a selected environment for the promotion of goods and services individualized to that consumer.

It is an objective of the instant invention to provide a display device which includes, but is not limited to, a mobile device, smart television, heads-up display, film having augmented reality, or the like.

It is another objective of the instant invention to provide a connection between the display device and the consumer's mobile device, such as Wi-Fi, near field communication, radio frequency transmission, or the like.

Still another objective of the instant invention is to provide an algorithm that will make queries to the customer to establish a level of comfort therewith. Such queries may include the customers destination, personal comfort inside the vehicle (such as temperature), and whether or not the customers would like to listen to a certain genre of music.

Another objective of the instant invention is to provide an algorithm that will then use the queries and data (such as cookies) obtained from the customer's mobile device to narrowly and effectively communicate promotions of goods and services to the customer that are personal and individualized. For instance, if the customer is headed to the beach, the algorithm may suggest promotion of local eateries, or the purchase of towels, sunscreens, umbrellas or similar items.

It is another objective of the instant invention to provide an embedded algorithm trained to receive input data (personal data, such as cookies) and provides an output for the promotion of goods and services customized to each individual customer.

It is still another objective of the instant invention to provide an embedded algorithm with the capacity for recognition of input data (personal data, such as cookies).

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
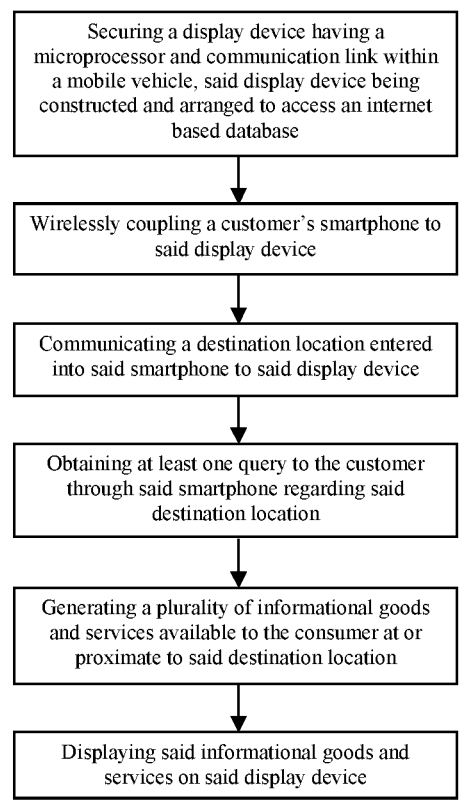
FIG. 1 is a flow chart diagram of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIG. 1, customers in a contained environment are a captive audience. The contained environment could include, but is not limited to, a vehicle destination service such as Uber®. The vehicle destination service would be equipped with a display device that is constructed and arranged to access an internet-based database; examples of such display devices include, but are not limited to, a mobile device, smart television, heads-up display, or film having augmented reality. A customer would enter the contained environment, such as a vehicle destination service and, with the customer's mobile device, establish a connection with a display device within the vehicle. This connection can be established using Wi-Fi, near field communication, radio frequency transmission, or the like. The display device can thereby access or obtain the destination location that the customer has already entered into the vehicle destination service application. The display device can query the customer regarding the destination location. Then, using an algorithm, the display device can generate from the internet based database a plurality of informational goods and services available to the customer at or proximate to the destination location. The plurality of informational goods and services can then be displayed to the customer on the display device or the customer's mobile device. It is further contemplated that the algorithm can generate a plurality of informational goods and services according to an affinity determined for the customer. For instance, the affinity can be based upon the destination location and the time of day. Thus, if the customer's destination location is the beach, with an approximate arrival time of 9:00 p.m., it is unlikely that the customer would benefit from the promotion of sunscreen or umbrellas. The algorithm can generate, from the internet based database, a list of goods and services more applicable to goods and services that are better suited at 9:00 p.m., at or proximate to the destination location, such as but not limited to, restaurants, entertainment services, hotels, drinking establishments or the like. Furthermore, the affinity can be based upon destination location, time, and environmental conditions. For example, if the customer's destination location is the beach and the weather calls for a 5% chance of rain and extreme heat, it is likely the customer would benefit from the suggestion of goods and services such as sundries, e.g., towels, sunscreen, umbrellas, or the like. Thus, the display device can generate, from the internet-based database, a plurality of goods and services according to the affinity.

Additionally, the coupling between the display device and the customer's mobile device would allow data to be passed from the customer's mobile device to the display device. It is contemplated that the data that is passed through is data that is personal to the customer; examples of such data might include what music the customer listens too, frequent destinations, searched products and services, and the like. This data can be exchanged either with permission or unknowingly. By establishing a connection between the display device and the mobile device, the customer willingly, or perhaps unknowingly, allows the display device access and permission to cookies and personal data that are embedded in the customer's mobile device. This data can then be used to submit queries to establish a level of comfortability with the customer upon entering the vehicle destination service, or the data can be used to create a more sophisticated affinity based off cookies, personal preferences, or the like; thus allowing the display device to generate, from the internet based database, a plurality of goods and services that are based off a more sophisticated affinity that combines data obtained from the customer's mobile device and/or the destination location and/or the time of day, or any combination thereof. This sophisticated affinity that generates a database of goods and services would be more personal to the customer.

Figure 2:
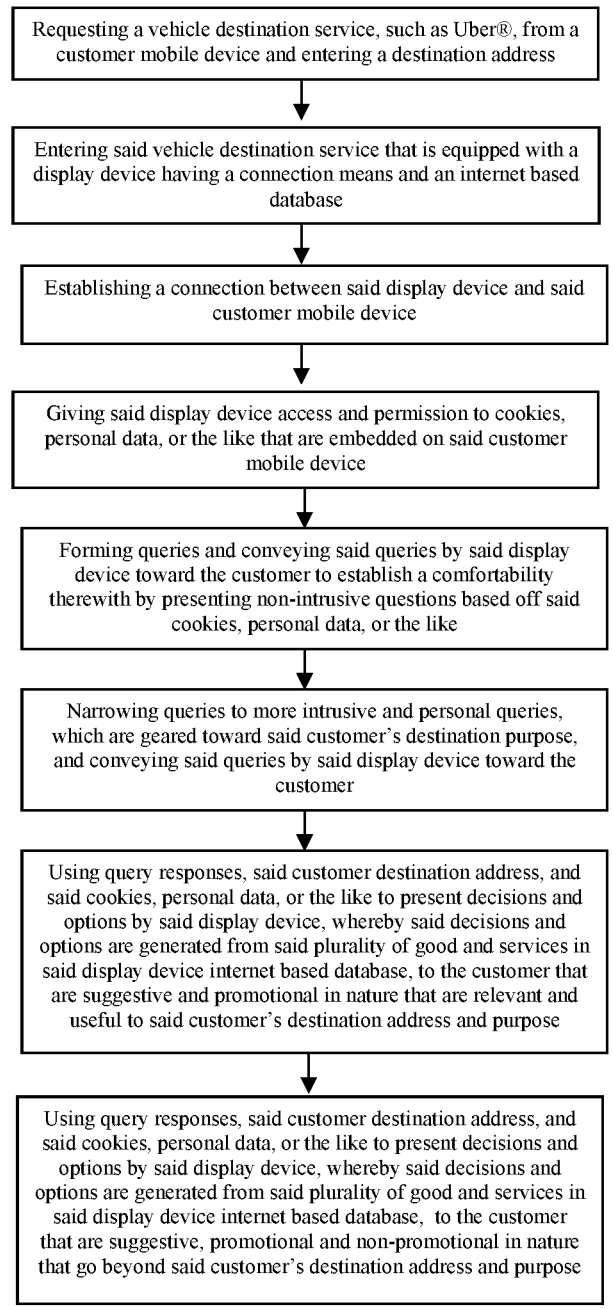
FIG. 2 is a flow chart diagram of an alternative embodiment of the instant invention.

Referring now to FIG. 2, whereby an alternative embodiment contemplates the use of queries to establish a level of comfortability with the customer before promoting a plurality of goods and services. Customers in a contained environment are a captive audience. The contained environment could include, but is not limited to, a vehicle destination service such as Uber®. The vehicle destination service would be equipped with a display device that is constructed and arranged to access an internet based database. A customer would enter the contained environment, such as a vehicle destination service and, with the customer's mobile device, establish a connection with a display device within the vehicle. This connection can be established using Wi-Fi, near field communication, radio frequency transmission, or the like. This connection would allow data to be passed from the customer's mobile device to the display device. It is contemplated that the data that is passed through is data that is personal to the customer; examples of such data might include, what music the customer listens too, frequent destinations, searched products and services, and the like. To establish this connection, it is contemplated that permission must be sought and given by the customer. The customer would agree to establish connection, and also consent to the transmission of personal data relating to the customer, for instance cookies. Once a connection is established, which would include consent to transfer personalized data, the customer would be presented with queries, whereby the customer makes decisions regarding those queries.

By presenting decisions to the customer, decisions that the customer feels are made by their own accord, the customer in turn feels as if they are in control of the decision-making process, thereby establishing a level of comfort and confidence with the process employing the display device. It is essential to provide an algorithm that eases the customer's uncertainty and resistance. One of the first steps in the algorithm would be to make the customer feel welcome. Queries that are individually based, such as "Would you like to lower the temperature in the vehicle?" or "Would you like to listen to a [suggested] radio station or music genre?", would establish a comfortability and easiness between the customer and the display device. These queries would start to personalize the experience for the customer. Thus, the queries would begin as non-intrusive in nature. Similarly, the queries can then narrow in on the purpose of the customer's destination onboard the vehicle destination service. By determining the purpose of the customer's destination, the algorithm can present offers or suggestions which are promotional in nature. These offers or suggestions are compiled by the algorithm which generates a list of promotional offers and suggestions, such as goods and services, from the internet database in the display device that are specific to the customer's answers to the queries. For instance, should the destination be part of a leisure trip, the algorithm can promote products and services that are likely to be visited or enjoyed by a customer during a leisure experience (such as historical locations, museums, restaurants, theatres, retail centers, etc.) However, if the destination is part of a business trip, the algorithm can promote products and services that are business related, efficient, quick, and geographically nearby (such as coffee shops, on-the-go restaurants, etc). It is contemplated that the offers or suggestions which are promotional in nature need not be relevant or useful to the customer's destination or purpose. The offers and suggestions can go beyond the customer's destination and purpose, and be determined by query responses, cookies, personal data, and the like that have been accessed by the display device and processed by the algorithm. The algorithm receives input data, such as personal data, and provides output data in the form of promotion of good and service personal to each customer. The algorithm mimic cognitive functions to promote the goods and services according to the affinity of the input data received.

By way of example, a customer seeks a vehicle destination service, typically referred to as a ride share application available on their mobile device, such as Uber®, and the customer enters a destination address. The customer would then enter a vehicle that is part of the vehicle destination service. The vehicle destination service would be equipped with a display device having a connection means, such as an RF transmitter, Wi-Fi, near field technology, or the like. The display device would be constructed and arranged to access an internet based database. The customer would be equipped with their own display device, the mobile phone, which includes various connection means. The customer would then, automatically or manually, establish a connection between their mobile device and the display device onboard the vehicle. By establishing a connection, the customer willingly, or perhaps unknowingly, allows the display device access and permission to cookies and personal data that are embedded in the customer's mobile device. Additionally, the connection can access and activate other information such as: account information, contacts, people, address books, calendars, history of phone calls on the mobile device, email and account info from email accounts, GPS or other location-finding features, location data in maps and on the vehicle destination service, music files, notifications, picture files, task lists, video files, Wi-Fi connections between the mobile device, the internet and other devices, and the like. In turn, the algorithm embedded in the display device would use the cookies and other personal data that it has obtained to form queries in order to establish some form of comfortability with the customer. The display device can access the music files and determine that the customer has an interest in a particular genre of music. Thereby, the display device can then ask the customer, "Would you like to listen to [a particular] music genre station?". These initial queries are established to create comfortability with the customer and ease any tension, resistance, or weariness the customer may have regarding the intent of the display device.

Similarly, the queries can narrow in on the purpose of the customer destination. By determining the purpose of their destination, one can present decisions that are promotional in nature to the customer that are relevant and useful to their destination. For instance, should the destination be part of a leisure trip, the algorithm can promote products and services that are likely to be consumed and enjoyed by a customer during a leisure experience (such as historical locations, museums, restaurants, theatres, retail centers, etc.). The display device would generate the list of promoted goods and services from the internet based database embedded in the display device. The intent is to not seem intrusive with marketing and promotion, and only promote goods and service that are relevant and personal to each customer.

It is further contemplated that the vehicle destination service is not equipped with a display device. Thereby, the customer's mobile device would act as the display device so long as a connection is established and permission is granted by the customer.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An automated method for promoting goods and services within a mobile vehicle employed to transfer a consumer to a destination location inputted by use of a smartphone, comprising the steps of:
    securing a display device having a microprocessor and communication link within said mobile vehicle, said display device constructed and arranged to access an internet based database;
    wirelessly coupling said smartphone to said display device;
    displaying communicated destination location entered through said smartphone on said display device;
    activating an algorithm for selecting goods and services according to an affinity determined for the consumer;
    soliciting destination location queries through said smartphone using said algorithm to individualize said destination location queries, conditioned upon said algorithm producing at least one query constructed to put the consumer in control of their decision-making process;
    generating a plurality of informational goods and services available to the consumer at or proximate to said destination location that are personal and individualized to the consumer; and
    displaying said informational goods and services on said display device.

2. The automated method for promoting goods and services within a mobile vehicle according to claim 1 including the step of displaying said informational goods and services on said smartphone.

3. The automated method for promoting goods and services within a mobile vehicle according to claim 1 wherein said affinity is based upon the destination location and a time of day, wherein said goods and services displayed are local events at the destination location available at said time of day.

4. The automated method for promoting goods and services within a mobile vehicle according to claim 1 wherein said affinity is based upon the destination location and a time of day, wherein said goods and services displayed are local eateries at the destination location available at said time of day.

5. The automated method for promoting goods and services within a mobile vehicle according to claim 1 wherein said affinity is based upon the destination location and environmental conditions, wherein said database is used to display locations for purchase of sundries, if the destination is a beach and environmental conditions depict favorable beach conditions.

6. The automated method for promoting goods and services within a mobile vehicle according to claim 1 wherein said affinity is based upon destination location and environmental conditions, wherein said database is used to display locations for purchase of umbrellas if the destination location depicts inclement weather.

7. The automated method for promoting goods and services within a mobile vehicle according to claim 1 wherein said affinity is learned from smartphone based cookies, wherein said destination location is combined with the consumer's preferred entertainment preferences to display similar entertainment services at the destination location.

8. The automated method for promoting goods and services within a mobile vehicle according to claim 1 wherein said goods and services provides suggestion that are promotional.

9. The automated method for promoting goods and services within a mobile vehicle according to claim 1 wherein said goods and services are selected if a response to a query indicates travel is for leisure.

10. The automated method for promoting goods and services within a mobile vehicle according to claim 1 wherein said goods and services are selected if a response to a query indicates travel is for business.

* * * * *